United States Patent
Watanabe

[15] 3,655,016
[45] Apr. 11, 1972

[54] ANTI-SKID BRAKE APPARATUS
[72] Inventor: Yoshinori Watanabe, Saitama-ken, Japan
[73] Assignee: Honda Giken Kogyo Kabushiki Kaisha, Chuo-ku, Tokyo, Japan
[22] Filed: June 5, 1970
[21] Appl. No.: 43,808

[30] Foreign Application Priority Data
June 5, 1969 Japan....................................44/43556

[52] U.S. Cl..............................188/181 T, 188/2 A, 188/26
[51] Int. Cl. .........................................................B60t 8/00
[58] Field of Search...................188/26, 180, 181, 181 T, 2 A

[56] References Cited
UNITED STATES PATENTS 2,292,621   8/1942   Eksergian..............................188/181
2,871,988   2/1959   Wilkerson..........................188/181 X

FOREIGN PATENTS OR APPLICATIONS 616,316   3/1961   Canada..............................188/181 T

*Primary Examiner*—Duane A. Reger
*Attorney*—Waters, Roditi, Schwartz & Nissen

[57] ABSTRACT

An anti-skid brake apparatus comprises a brake plate rotatably attached to a vehicle frame with a first spring interposed between the plate and the vehicle body. A brake actuator member on the brake plate is connected via a second spring to a brake pedal, and the two springs are so arranged that they resist the rotation of the brake plate imposed thereon by the wheel at the time of brake operation.

10 Claims, 1 Drawing Figure

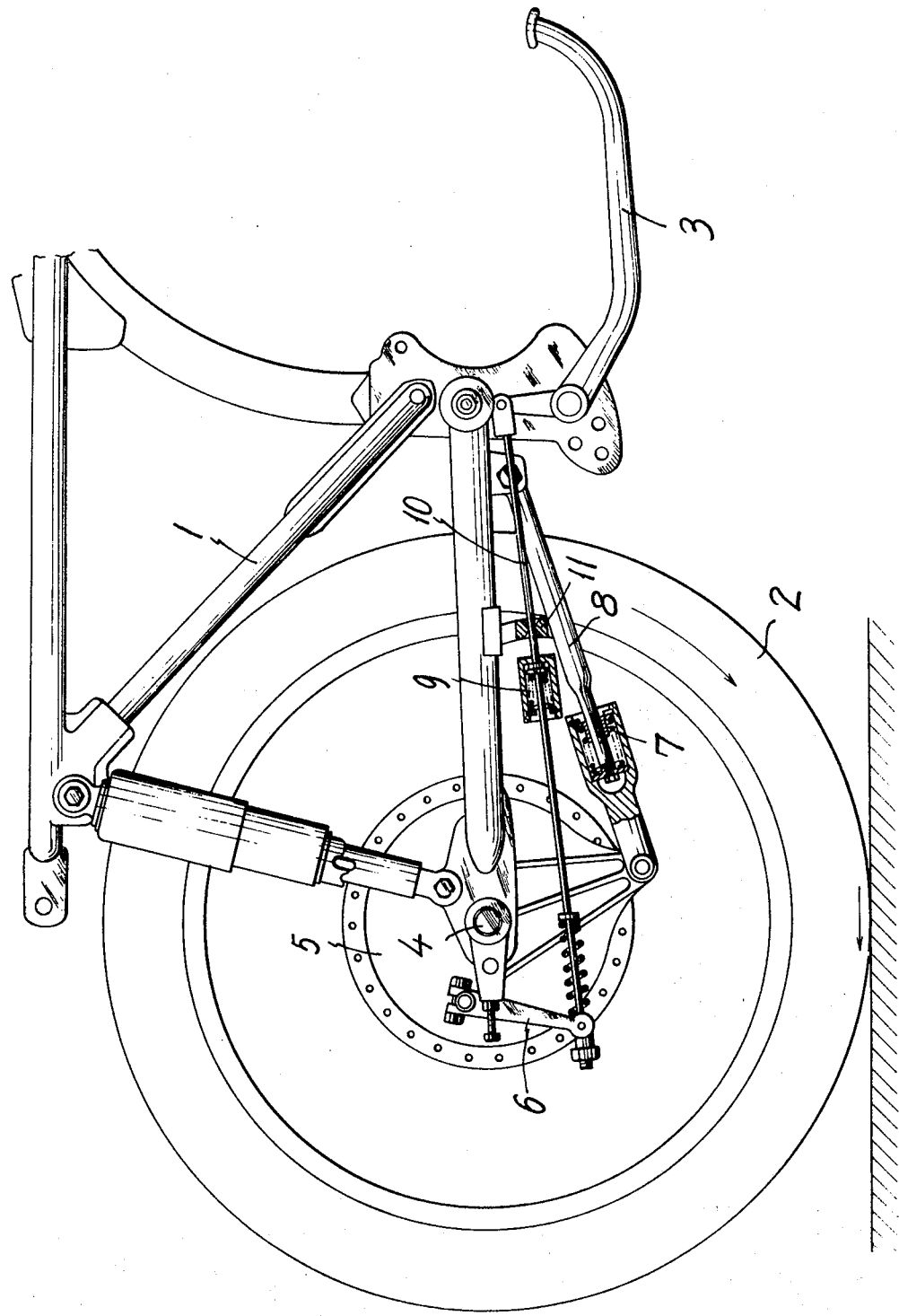

ANTI-SKID BRAKE APPARATUS

BRIEF SUMMARY OF THE INVENTION

This invention relates to an anti-skid type brake apparatus applicable to a motorcycle or like vehicle and is characterized in that a brake plate rotatably attached to a vehicle body is connected via a first spring to the vehicle frame and a brake actuator member provided on the brake plate is connected via a second spring to a brake applicator such as a brake pedal, such that the two springs resist the rotation of the brake plate imposed by the vehicle wheel at the time of the brake operation.

BRIEF DESCRIPTION OF THE DRAWING

The sole FIGURE of the drawing shows in schematic side elevation view, partly in section, an embodiment according to the present invention.

DETAILED DESCRIPTION

Referring to the drawing, numeral 1 denotes a vehicle frame which carries a rear wheel 2 and numeral 3 denotes a brake pedal provided in front of the wheel 2. A brake plate 5 is rotatably mounted on a shaft 4 of the wheel 2. The plate 5 has on its inner surface a friction brake member such as a brake pad (not shown) and on its outer surface a lever type brake actuator member 6 for operating the brake member. The plate 5 is connected to the frame 1 through a first connecting rod 8 incorporating a first compression spring 7, and the brake actuator member 6 is connected to the brake pedal 3 through a second connecting rod 10 incorporating a second compression spring 9. These connecting rods 8 and 10 extend in such directions that when the brake plate 5 is rotated in the direction as indicated by the arrow with the rotation of the wheel 2, the springs 7 and 9 resist the rotation thereof. For limiting the downward movement of the brake pedal 3 to a predetermined amount, there is provided a stop 11 which restricts the forward movement of the second connecting rod 10 to a predetermined amount.

The operation of the apparatus is as follows.

If the brake actuator member 6 is operated through the second connecting rod 10 by the downward movement of the brake pedal 3, the brake rod on brake plate 5 is engaged with the rotating wheel 2 and thereby the plate 5 is subjected to a rotation force in the clockwise direction in the drawing. However, this rotation is restricted to a predetermined amount by the compression forces of the respective springs 7 and 9 of the respective connecting rods 8 and 10 which oppose the rotation, and thus a predetermined brake force is applied to wheel 2. If, at this time, the brake force is so large that a slip is produced between the wheel 2 and the road surface, the reaction force of the wheel 2 at the road surface is decreased in the direction as indicated by the arrow at the road surface, and this results in a decrease in the rotation force in the direction of the arrow. This decrease acts to decrease the pulling forces acting on the first and second connecting rods 8 and 10, whereby the respective springs 7 and 9 are lowered in their degrees of compression. In accordance therewith, the brake actuator member 6 is decreased in its pulling force acting from the brake pedal 3 side and the brake force on the wheel 2 is decreased in proportion thereto, and thus an anti-skid effect preventing slip is produced.

Thus, in the apparatus according to this invention the brake force is decreased automatically when a slip is caused between the wheel and the road surface, whereby an anti-skid effect is positively obtained. Additionally, the apparatus is very simple in construction because it is only required that the brake plate and the brake actuation member therein are provided with respective springs between the same with the frame and the brake applicator, respectively, and thus they can be manufactured economically.

What is claimed is:

1. An anti-skid brake apparatus for a vehicle having a frame and a wheel to be braked rotatably attached to the frame, said brake apparatus comprising a brake plate with means for application of brake force to the wheel, means rotatably connecting the brake plate to the frame and including means incorporating a first spring means connecting the plate to said frame, and brake actuator means coupled to said brake plate and the frame and incorporating a second spring means, said first and second spring means being arranged to resist rotation of the brake plate upon application of brake force to the wheel.

2. Brake apparatus as claimed in claim 1 comprising stop means operatively positioned with respect to said actuator means to limit the degree of actuation thereof.

3. Brake apparatus as claimed in claim 1 wherein the means incorporating the first means comprises a connecting rod means connected between said brake plate and the frame, said first spring means being a compression spring incorporated in said rod means.

4. Brake apparatus as claimed in claim 3 wherein said brake actuator means comprises a brake applicator, an actuator member coupled to said brake plate, and a second connecting rod means connected between said actuator member and said brake applicator, said second spring means being a compression spring incorporated in said second rod means.

5. Brake apparatus as claimed in claim 4 wherein said brake applicator is a brake pedal.

6. Brake apparatus as claimed in claim 4 wherein said connecting rod means extend forwardly from the wheel to be braked which is a rear wheel.

7. Brake apparatus as claimed in claim 6 wherein the brake plate is rotatable about the axis of rotation of the wheel to be braked.

8. Brake apparatus as claimed in claim 7 wherein both said connecting rod means extend tangentially with respect to said brake plate.

9. Brake apparatus as claimed in claim 8 wherein each connecting rod means comprises an axial arrangement of a rod and cylinder with the respective compression spring interposed therebetween.

10. Brake apparatus as claimed in claim 9 wherein each of the axial arrangements of the rod means is radially offset from the axis of rotation of the wheel.

* * * * *